March 27, 1951        H. W. MORRIS        2,546,609
GLARE SHIELD FOR AUTOMOBILES
Filed Feb. 17, 1950
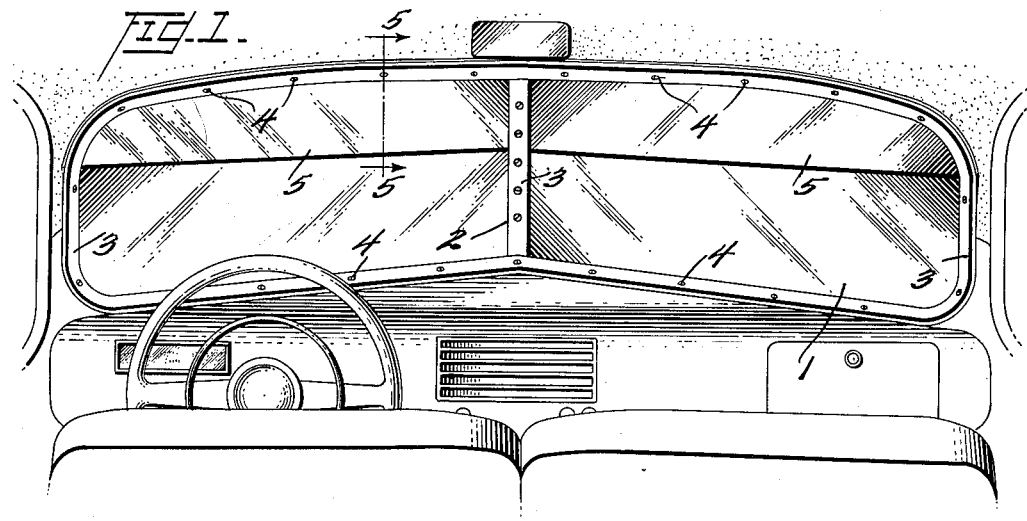
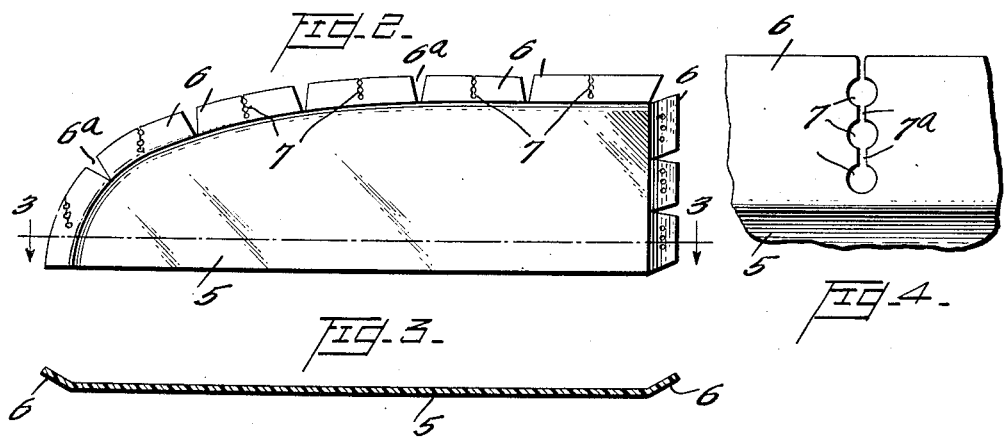
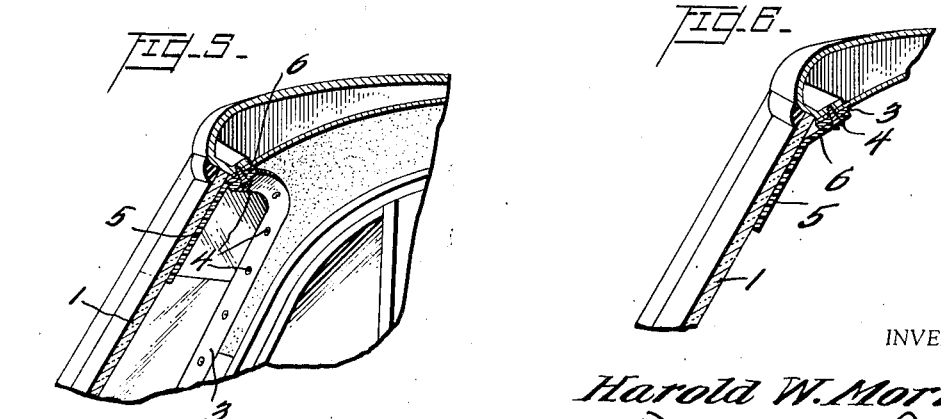
INVENTOR
Harold W. Morris,
BY
ATTORNEY Patented Mar. 27, 1951

2,546,609

UNITED STATES PATENT OFFICE 2,546,609

GLARE SHIELD FOR AUTOMOBILES

Harold W. Morris, Bozeman, Mont.

Application February 17, 1950, Serial No. 144,705

2 Claims. (Cl. 296—97)

This invention relates to glare shields for automobiles of the general type comprising a sheet of tinted plastic material secured to the windshield or window of an automobile for reducing direct and reflected glare from the sun during the daytime and from the headlights of oncoming cars at night.

An important object of my invention is to provide a glare shield of the above character which is adapted to be more or less fixedly attached to an automobile windshield or window so as to lie flat and in unbuckled condition against the glass of the windshield and free from vibration and fluttering.

More particularly it is an object of my invention to provide a glare shield of the above character having marginal flanges that are adapted to be secured to the molding surrounding the windshield or window of an automobile.

Other objects and advantages will be apparent from the following detailed description of a preferred embodiment of the invention, reference being had to the annexed drawing in which:

Figure 1 is a view of the windshield of an automobile viewed from inside the automobile and showing the glare shield attached thereto;

Figure 2 is a view of the glare shield alone;

Figure 3 is a longitudinal cross-sectional view through the glare shield taken on the line 3—3 of Fig. 2;

Figure 4 is a detailed view of a portion of the marginal flange of the glare shield showing the screw holes for attaching the glare shield in place; and Figure 5 is a detailed cross-sectional view taken on the line 5—5 of Figure 1.

Figure 6 is a detailed cross-sectional view similar to that of Figure 5, but illustrating another way in which the glare shield may be attached to the windshield.

In Figure 1 is shown a glass windshield 1 which is representative of the windshields used on automobiles of the present day except for minor differences of shape and dimensions. The windshield is medially divided into two sections by an upright center post 2, and perimetrally surrounding and bearing against the windshield glass and extending up and down the center post are strips of molding 3 secured to the automobile body by screws 4. The molding 3 is removable by releasing the screws 4.

Extending in the form of a wide strip across the upper part of each section of the windshield is a glare shield 5. The glare shield comprises a sheet of tinted plastic material, such as cellophane, cut generally to the size and shape of the windshield section but including along its upper and side edges flanges 6 of excess material adapted to fit under the molding 3. The flanges 6 are notched at 6a to facilitate bending and the flanges are bent slightly out of the plane of the glare shield, as best shown in Figure 3. The flanges are provided with holes 7 corresponding in location with the screws 4 that secure the molding in place. These holes preferably are formed in groups of two or more and connected by vertical slits 7a as extending vertically of the glare shield (as best shown in Figure 4) to allow for limited vertical adjustment of the glare shield to meet the individual preference of the automobile driver.

In fastening the glare shield to the windshield, the molding strips 3, by loosening the screws 4, are removed or else backed off sufficiently to allow the flanges 6 of the glare strip to be introduced between the molding and the automobile body with the appropriate holes 7 coinciding with the screw holes in the body, after which the screws are tightened to firmly clamp the glare shield against the glass of the windshield. An alternative way of securing the glare shield to the windshield is illustrated in Figure 6. In this arrangement of the flanges 6 of the glare shield are laid over the outer face of the molding and clamped in place by the screws 4. In either case, the glare shield may be easily and quickly installed, and when once in place it will be held firmly against the glass of the windshield free from vibration or fluttering.

While the glare shield has been described in connection with the windshield of an automobile, it may be attached to any of the side or rear windows of an automobile in the same manner as described above. The term "window" as used herein is meant to include the windshield of an automobile. Also, instead of being secured to the upper portion of a windshield, the glare shield may, if desired, be attached to the lower portion of the windshield to screen out the glare reflected from the hood of the automobile in sunny weather. Of course, glare shields intended for the different windows or for different makes of automobiles will have to be cut to the special sizes required, but for the windshields of the more popular makes of automobiles, my glare shields may be turned out in quantity lots for sale to the public in retail stores.

When I have described above a preferred embodiment of the automobile glare shield of my invention, it is to be understood that various changes in construction and design may be made in the glare shield without departing from the spirit of my invention as defined by the following claims.

I claim:

1. A glare shield for automobile windows comprising a flat sheet of tinted plastic material of generally rectangular shape having one curved longitudinal edge, a marginal flange integrally united with the curved edge of said sheet, notches dividing said flange into sections to facilitate bending the flange out of the plane of the sheet and fastener holes in said flange located at longitudinally spaced intervals for securing said sheet to the frame of the window.

2. A glare shield for automobile windows comprising a flat sheet of tinted plastic material of generally rectangular shape having one curved longitudinal edge, a marginal flange integrally united with the curved edge of said sheet, notches dividing said flange into sections to facilitate bending the flange out of the plane of the sheet and fastener holes in said flange located at longitudinally spaced intervals for securing said sheet to the frame of the window, said fastener holes being provided in vertically-disposed groups and the holes of each group being connected by vertical slits.

HAROLD W. MORRIS.

REFERENCES CITED

The following references are of record in the file of this patent:

UNITED STATES PATENTS

| Number | Name | Date |
|---|---|---|
| 1,332,225 | Machacek, Jr. | Mar. 2, 1920 |